US006823969B2

(12) United States Patent
Simmonds et al.

(10) Patent No.: US 6,823,969 B2
(45) Date of Patent: Nov. 30, 2004

(54) BRAKING DEVICE FOR AN ELEVATOR

(75) Inventors: Oliver Simmonds, Lucerne (CH); Stefan Hugel, Adligenswil (CH); Julien Maury, Lucerne (CH); Peter Möri, Rothenburg (CH); Peter Aeschlimann, Wolhusen (CH)

(73) Assignee: Inventio AG, Hergiswil NW (CH)

( * ) Notice: Subject to any disclaimer, the term of this patent is extended or adjusted under 35 U.S.C. 154(b) by 0 days.

(21) Appl. No.: 10/303,624

(22) Filed: Nov. 25, 2002

(65) Prior Publication Data

US 2003/0085085 A1 May 8, 2003

Related U.S. Application Data

(63) Continuation of application No. PCT/CH01/00316, filed on May 23, 2001.

(30) Foreign Application Priority Data

May 25, 2000 (EP) ........................................... 00810452

(51) Int. Cl.[7] ................................................. B60T 7/12

(52) U.S. Cl. ..................... 188/129; 188/181 A; 188/36; 188/119; 188/136; 188/139; 188/178; 188/181 R; 187/370

(58) Field of Search ................................ 187/370, 371, 187/372, 366; 188/181 A, 36, 38, 38.5, 41, 43, 44, 63, 119, 129, 135, 136, 139, 166, 178, 180, 181 R

(56) References Cited

U.S. PATENT DOCUMENTS

| | | | | | |
|---|---|---|---|---|---|
| 3,155,199 | A | * 11/1964 | Bricker | ....................... | 188/170 |
| 4,538,706 | A | * 9/1985 | Koppensteiner | ............ | 187/376 |
| 5,363,942 | A | * 11/1994 | Osada | ........................ | 187/376 |
| 5,370,208 | A | * 12/1994 | De Jong | ..................... | 187/372 |
| 5,782,319 | A | * 7/1998 | Woodruff et al. | ........... | 187/376 |
| 5,819,879 | A | * 10/1998 | Lang et al. | ................. | 187/376 |
| 5,964,320 | A | * 10/1999 | Kato et al. | .................. | 187/376 |
| 5,964,322 | A | * 10/1999 | Thompson et al. | .... | 188/251 M |
| 6,092,630 | A | * 7/2000 | Wendel et al. | ............. | 187/373 |
| 6,260,673 | B1 | * 7/2001 | Mustalahti | .................. | 188/186 |
| 6,325,184 | B1 | * 12/2001 | Lujan | ......................... | 188/185 |

FOREIGN PATENT DOCUMENTS

| | | | |
|---|---|---|---|
| EP | 0 957 059 | | 11/1999 |
| JP | 62-74896 | | 4/1987 |
| JP | 11011818 | * | 1/1999 |
| JP | 2000302351 | * | 10/2000 |

* cited by examiner

*Primary Examiner*—Robert A. Siconolfi
*Assistant Examiner*—Devon Kramer
(74) *Attorney, Agent, or Firm*—MacMillan, Sobanski & Todd, LLC

(57) ABSTRACT

A braking device acts on a guide rail and consists of a housing that is arranged at an elevator car yoke and serves as a support for spring packets and/or for adjusting packets. The housing also serves as a support and guide for chock guide elements that in turn retain and guide brake chocks with brake linings. Pushrods engage at one end at the brake chocks, and at the other end are pivotably connected to an actuating fork. Upon braking of the elevator car, the actuating fork is moved at the pushrod end in the direction of the braking device. The guided brake chocks with the brake linings slide in the braking device. At the same time the brake linings are moved at the guide leg of the guide rail. The brake chocks are moved in the braking device and the spring and adjusting packets are stressed, whereby a braking force for stopping an elevator car or a counterweight is generated.

10 Claims, 3 Drawing Sheets

BRAKING DEVICE FOR AN ELEVATOR

This application is a continuation of PCT/01/00316 filed on May 23, 2001.

BACKGROUND OF THE INVENTION

The present invention relates to a braking device for an elevator with an elevator car and a counterweight, which are movable along guide rails in an elevator shaft, wherein the braking device is arranged at the elevator car or at the counterweight and in the case of excess speed stops the elevator car or the counterweight at the guide rails by means of spring elements and brake chocks.

There is shown in the U.S. Pat. No. 5,782,319 a braking device for an elevator, which stops the elevator car in the case of emergency. The elevator car drives, by means of an endless cable, a rotating speed limiter, which blocks in the case of a specific excess speed of the elevator car. The blocked speed limiter also blocks the endless cable, but the elevator car moves further downwardly, wherein the blocked endless cable, which is connected with a release lever mechanism of the braking device, trips the braking device. In that case two guided chocks of the braking device are pushed upwardly. The braking force is generated by friction between the chocks and the guide rail of the elevator car. The braking force is on the one hand dependent on the friction of the chocks on the guide rail and on the other hand dependent on a C-shaped compact spring packet at the ends of which are provided guides for the chocks.

A disadvantage of this known device is that the spring packet and the guides are cast from one piece. The spring packet unit has to be manufactured in accordance with the respective braking force to be exerted, which increases the cost of the braking device.

SUMMARY OF THE INVENTION

The present invention concerns a braking device for attachment to one of an elevator car and a counterweight that are movable along guide rails in an elevator shaft, wherein the braking device is actuated to engage a guide rail in the case of excess speed. The braking device includes: a housing; a pair of brake chocks mounted on the housing and movable from a disengaged position to a guide rail engaging position; and at least one spring packet mounted on the housing and having opposed ends connected to associated ones of the brake chocks, the at least one spring packet being of modular construction having lamellae selected to produce a predetermined braking force. The braking device has each end of the spring packet detachably connected to the associated brake chock by a spring bracket. The braking device also can include at least one adjusting packet mounted on the housing and having opposed ends connected to an associated one of the brake chocks.

The advantages achieved by the braking device according to the present invention are essentially that a simple construction of the braking device is possible. The braking device consists of only a few different components. Further, it is advantageous that the braking device is adaptable, with the same components, to different braking forces. The braking device is thus usable, without great expense, for elevator cars or counterweights with different masses to be braked. Moreover, the braking device according to the present invention offers the possibility of fine adjustment with respect to the braking force. The spring elements consist of lamellae producible in a simple manner. A greater or lesser number of lamellae can be used in accordance with the respective braking force required.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

Figure 1:
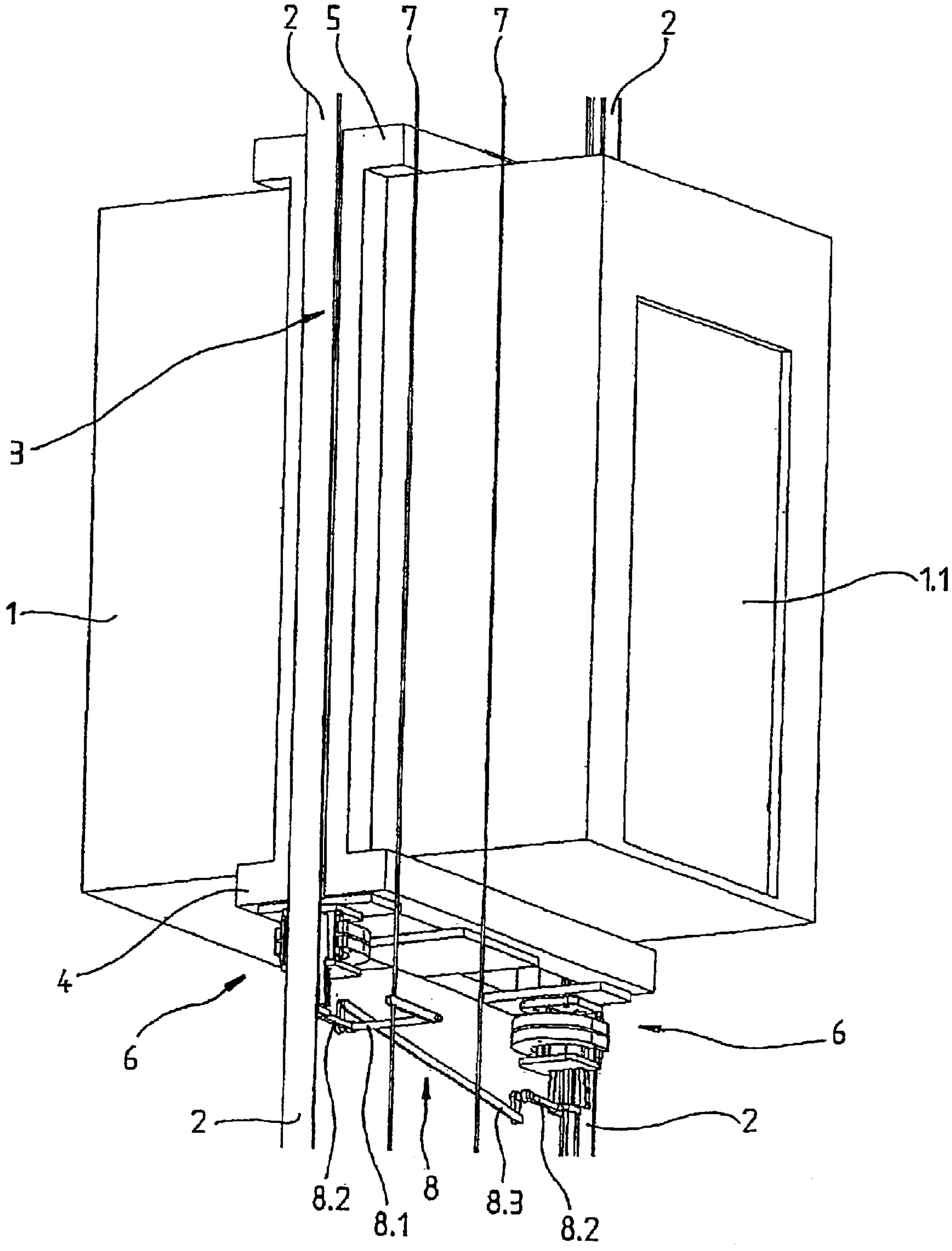
FIG. 1 is a perspective view of an elevator car with the braking device according to the present invention.

FIG. 1 shows an elevator car 1 movable in an elevator shaft (not shown) wherein the elevator car 1 is guided by means of guide rails 2 extending over the shaft height. The elevator car 1 is provided with a door 1.1 and is carried by a support frame 3 with a lower yoke 4 and an upper yoke 5. A support cable (not shown), one end of which is connected with, for example, the upper yoke 5 and the other end of which is connected with a counterweight (not shown), is guided over a drive pulley (not shown). A respective braking device 6, which stops the elevator car 1 in the case of emergency, is arranged at the lower yoke 4 on an associated guide rail 2. The elevator car 1 drives, by means of an endless cable 7, a rotating speed limiter (not shown) that blocks in a downward direction in the event of a specific excess speed of the elevator car 1. The blocked speed limiter also blocks the endless cable 7 guided over a tensioning roller (not shown) arranged in the shaft pit, but the elevator car 1 moves further downwardly, whereby the blocked endless cable 7 connected with a trigger lever mechanism 8 trips the braking device 6. The trigger lever mechanism 8 connected with the endless cable 7 consists of a rotational axle 8.1 at which an actuating fork 8.2, which trips the braking device 6, is arranged. The actuating fork 8.2 of the opposite braking device 6 is actuated by means of a connecting rod 8.3 arranged at the rotational axle 8.1. When the endless cable 7, also known as a limiter cable, is blocked, the rotational axle 8.1 is rotated in clockwise sense as seen from the car door 1.1. In that case the actuating fork 8.2 is raised at the free end.

If the braking device 6 is analogously arranged at the upper yoke 5, the elevator car 1 can be stopped in upward direction for cases of emergency. The braking device 6 can also be arranged at the counterweight.

Figure 2:
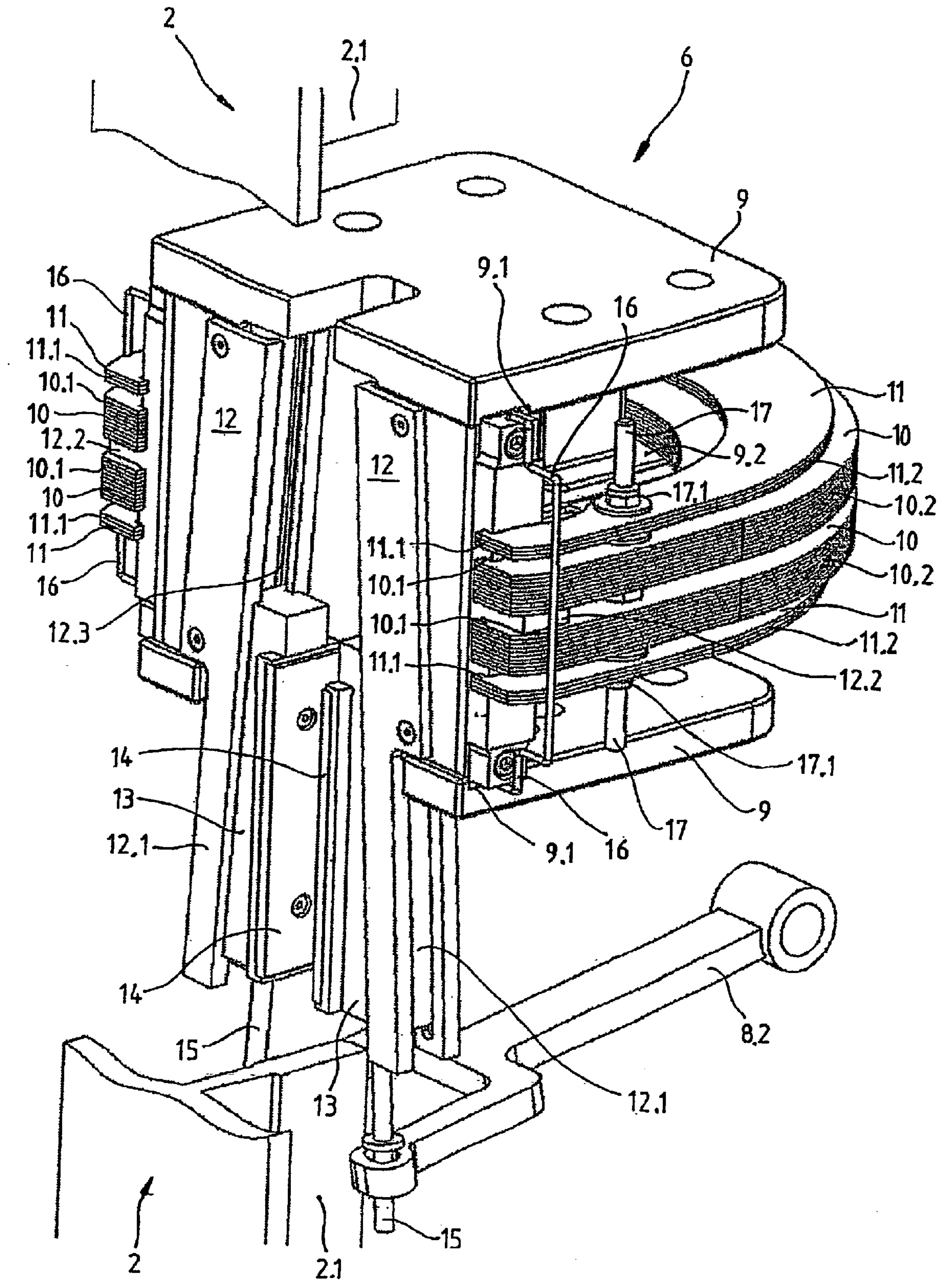
FIG. 2 is an enlarged perspective view of the braking device shown in FIG. 1 acting on a guide rail.

FIG. 2 shows details of the braking device 6 acting on a guide leg 2.1 of the guide rail 2. In order to make the details of the braking device 6 visible, the guide rail 2 is illustrated as broken away in the region of the braking device 6. The braking device 6 consists of a housing 9 which is arranged at the yoke 4, 5 and which serves as a support for spring packets 10 and/or for adjusting packets 11. The housing 9 also serves as a support and guide for chock guide elements 12, which in turn retain and guide brake chocks 13 with brake linings 14. A pushrod 15 engages at one end at the brake chock 13, and at the other end the pushrod 15 is pivotably connected with the actuating fork 8.2.

The spring packets 10 are of modular construction, as are the adjusting packets 11, and both are detachably connected at each end with a respective one of the wedge guide elements 12 by means of a respective spring bracket 16, wherein lugs 10.1 or 11.1 of the spring packets 10 or adjusting packets 11 prevent the packets from slipping off the chock guide elements 12. The packets 10, 11 are interconnected at each end by means of, for example, a threaded pin 17 and nuts 17.1, wherein first seats 12.2 of the chock guide elements 12 and at least one second seat 9.2 of the housing 9 hold the overall packet consisting of the spring packets 10 and the adjusting packets 11.

In the illustrated example, a spring packet 10 consists of ten lamellae 10.2 of the same thickness and the same material. The geometrically somewhat smaller adjusting packets 11 consist, in the illustrated example, of three lamellae 11.2. The lamellae 10.2, 11.2 are, for example, punched out of sheet metal. Other lamella materials or different lamella thicknesses are also possible. The lamellae 10.2, 11.2 can also have a shape departing from the illustrated "C" shape. The individual spring packets 10 or adjusting packets 11 of the braking device 6 can also have a different number of lamellae. Different spring constants, which have a direct effect on the braking force, can be produced in accordance with the respective number of lamellae, material, lamella thickness or lamella shape.

The chock guide element 12 is guided in first grooves 9.1 of the housing 9 and has an extension 12.1. In the case of normal operation, the brake chock 13 is held in a rest position by means of the extension 12.1 and the pushrod 15.

In the case of an emergency, the limiter cable 7 is blocked by the speed limiter detecting excess speed. The actuating fork 8.2 is thereby, as illustrated further above, moved at the pushrod end in the direction of the braking device 6. The brake chocks 13, which are guided in second grooves 12.3 of the chock guide elements 12, with the brake linings 14 slide in the braking device 6. At the same time the brake linings 14 are moved against the guide leg 2.1 of the guide rail 2. Due to the wedge-shaped arrangement of the chock guide elements 12 and the friction between the brake linings 14 on the guide leg 2.1, the brake chocks 13 are moved in the braking device 6 and the spring and adjusting packets 10, 11 stressed, wherein the braking force, which is dependent on the friction constant between the brake linings 14 and the guide leg 2.1 as well as on the spring constant, for stopping the elevator car or the counterweight is generated.

Figure 3:
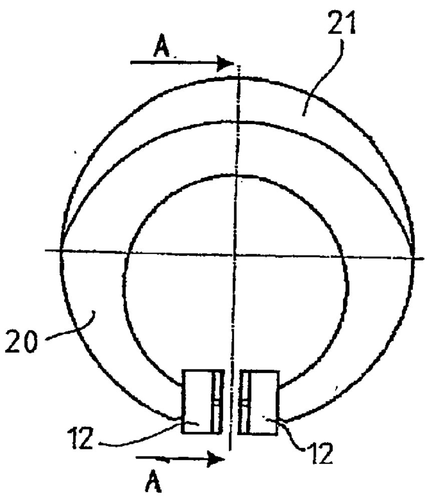
FIG. 3 is a plan view of a support body with spring elements according to the present invention.
Figure 4:
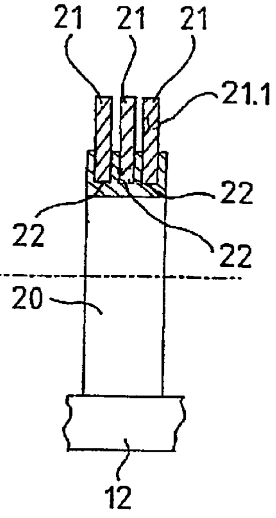
FIG. 4 is a cross-sectional view of the support body taken along the line A—A in FIG. 3.
Figure 5:
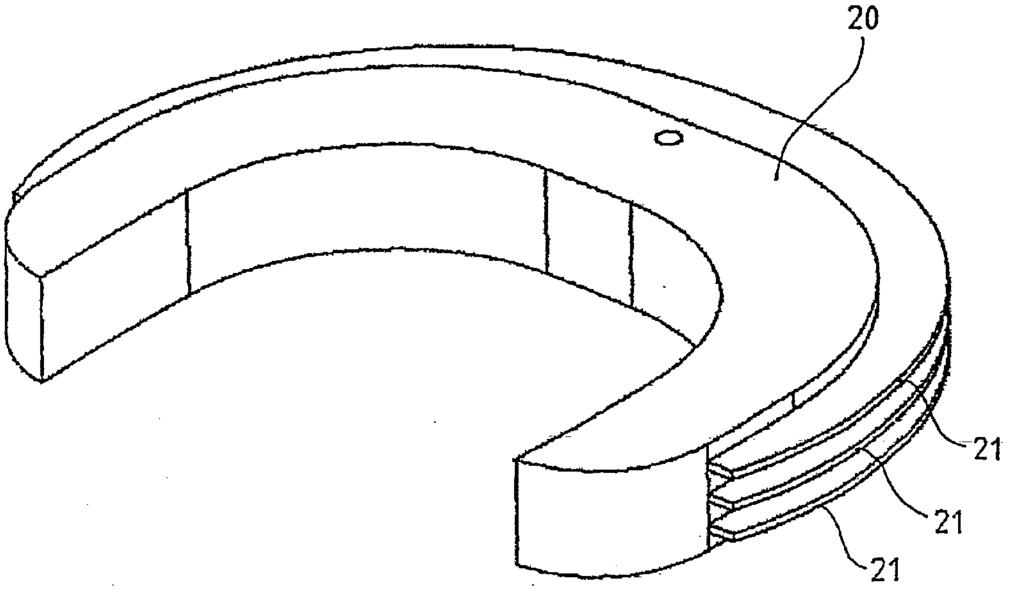
FIG. 5 is a perspective view of the support body shown in FIG. 3.

As illustrated in FIGS. 3 to 5, the spring packets can be arranged at a support body 20, wherein the support body, which is, for example, C-shaped, acts on the chock guide elements 12. The spring packets 21 consist of at least one lamella 21.1 and are laid in grooves 22 of the support body 20. In the illustrated example, three grooves and three spring packets 21 are provided. A greater or lesser number than three grooves 22 can also be provided, wherein the grooves 22 can also be of different widths. The spring packets 21 laid in the narrow grooves 22 can serve as adjusting packets. During the braking process the support body 20 and the spring packets 21 are stressed and the braking force for stopping the elevator car or the counterweight is produced. The braking device 6 can be provided with one or more of the support bodies 20.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A braking device for an elevator with an elevator car and an counterweight movable along guide rails in an elevator shaft, wherein the braking device is arranged at the elevator car or at the counterweight and in the case of excess speed stops the elevator car or the counterweight at the guide rails by means of spring elements and brake chocks, comprising: a plurality of spring elements of modular construction, said spring elements being selectively assembled for generating different braking forces, wherein said spring elements each are one of a spring packet and an adjusting packet and said spring packet and said adjusting packet are detachably connected at ends thereof with chock guide elements guiding the broke chocks.

2. The braking device according to claim 1 wherein said spring packet and said adjusting packet are C-shaped.

3. The braking device according to claim 1 wherein said spring packet is arranged at a support body that acts on said chock guide elements.

4. The braking device according to claim 3 wherein said support body has an associated groove formed therein for reception of each said spring packet.

5. A braking device for an elevator with an elevator car and a counterweight that are movable along guide rails in an elevator shaft, wherein the braking device is arranged at the elevator car or at the counterweight and in the case of excess speed stops the elevator car or the counterweight at the guide rails with spring elements and brake chokes, wherein the spring elements are of modular construction and generate different braking forces, comprising: a plurality of spring elements constructed from lamellae producible in a simple manner, each of said spring elements being one of a spring packet and an adjusting packet, each said spring packet being arranged at a support body that acts on chock guide elements guiding the brake chocks.

6. The braking device according to claim 5 wherein said spring elements are C-shaped.

7. The braking device according to claim 5 wherein said spring elements are detachably connected at ends with chock guide elements guiding the brake chocks.

8. The braking device according to claim 5 wherein said support body has an associated groove formed therein for receiving each of said spring packets.

9. The braking device for attachment to one of an elevator car and a counterweight that are movable along guide rails in an elevator shaft, wherein the braking device is actuated to engage a guide rail in the case of excess speed, comprising:

a housing;

a pair of brake chocks mounted on said housing and movable from a disengaged position to a guide rail engaging position; and at least one spring packet mounted on said housing and having opposed ends connected to associated ones of said brake chocks, said at least one spring packet being of modular construction having lamellae selected to produce a predetermined braking force, and including at least one adjusting packet mounted on said housing and having opposed ends connected to an associated one of said brake chocks.

10. The braking device according to claim 9 wherein each end of said spring packet is detachably connected to said associated brake chock by a spring bracket.

* * * * *